No. 665,185. Patented Jan. 1, 1901.
R. M. CROCKETT & H. J. BUNDY.
ROCK DRILL SHARPENER.
(Application filed Apr. 19, 1900.)
(No Model.)
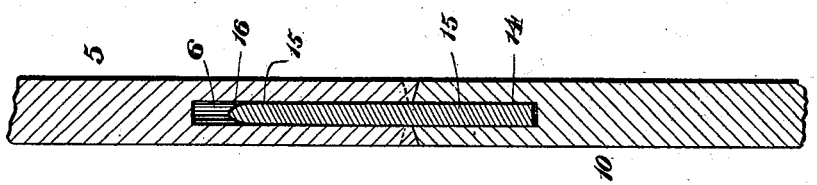
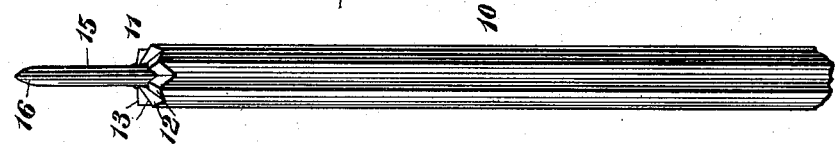
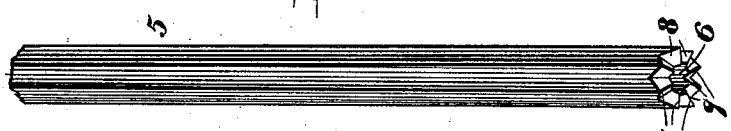
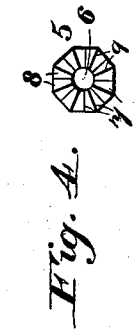
Witnesses
Louis E. Langille.
Ralph M. Crockett, and
Harvey J. Bundy, Inventors.
By E. G. Siggers,
Attorney.

UNITED STATES PATENT OFFICE.

RALPH M. CROCKETT AND HARVEY J. BUNDY, OF MOSCOW, IDAHO.

ROCK-DRILL SHARPENER.

SPECIFICATION forming part of Letters Patent No. 665,185, dated January 1, 1901.

Application filed April 19, 1900. Serial No. 13,632. (No model.)

*To all whom it may concern:*

Be it known that we, RALPH M. CROCKETT and HARVEY J. BUNDY, citizens of the United States, residing at Moscow, in the county of Latah and State of Idaho, have invented a new and useful Rock-Drill Sharpener, of which the following is a specification.

Our invention relates to rock-drills and sharpeners therefor; and the object in view is the provision of means for rapidly and accurately repointing the working end of the drill and allowing the active or die face of the sharpener to be itself redressed when worn to such an extent as to impair its efficiency.

Further objects and advantages of the invention will appear in the course of the subjoined description, and the novelty in the construction and combination of parts will be defined by the claim.

In the drawings, Figure 1 is a perspective view of a stone or rock drill of the type in connection with which the sharpener is employed. Fig. 2 is a like view of the sharpener, illustrating the die thereof and the centering-stem, the latter serving to accurately present the die of the sharpener into registering relation with the working end of the drill. Fig. 3 is a longitudinal sectional view through the drill and the sharpener, illustrating these parts in operative relation for the purpose of repointing the drill by the die of the sharpener.

The same numerals of reference denote corresponding parts in all the figures of the drawings.

The body or stock 5 of the drill is provided with a central bore or opening 6, which extends through the working end of said drill. This working end is formed by an annular series of points or teeth 7, each of which is provided with reversely inclined or beveled faces 8, that terminate in the cutting edges 9, thus making each tooth of tapering form and disposing the cutting edges on lines radial to the axis of the drill. In the drawings we have shown the stock or body 5 as of angular form in cross-section, preferably hexagonal, and the teeth have their cutting edges in the plane of the division-lines between the faces; but the contour of the stock is not material, because it may be of cylindrical form or any other desired shape in cross-section.

The drill has a plurality of cutting edges as distinguished from an ordinary drill with a single cutting edge, whereby the implement is adapted to cut or bore an opening in hard or soft rock at greater speed and accomplish an increased amount of work as compared with ordinary drills. The improved drill having its plurality of cutting edges arranged in the manner described is furthermore advantageous in that it will not become caught or "hang" in the opening of the rock, which is one of the objections to the ordinary drill and which frequently requires abandonment of the operation of cutting the hole, even after considerable time and labor shall have been expended. The improved drill is simple and durable in construction and it will last for quite a long time, because its working end can be readily repointed.

The important feature of our invention is the provision of means for expeditiously repointing the drill when its cutting edges become dulled and also in means for accurately presenting the die-face of the sharpener or repointing implement to the working end of the drill. We employ a sharpener 10, corresponding in form and diameter to the drill-stock. One end of this sharpener is formed with a die-face 11, which is a complement to the working end of the drill. This die-face of the sharpener has a series of points or teeth 12, each provided with beveled faces 13, which are disposed in corresponding relation to the desired contour of the teeth 7 on the drill. This sharpener is also provided with the bore or cavity 14, which is adapted for the reception of an end portion of the centering-stem 15. This stem protrudes a suitable distance beyond the die or active end of the sharpener, and its extremity is reduced or pointed, as at 16, for the purpose of readily entering the bore or cavity 6 of the drill-stock.

When the working end of the drill becomes dulled, we proceed to resharpen the same with the aid of the sharpener 10 in the following manner: The working end of the drill is heated by any suitable means to the required heat, and the drill is then fastened firmly in place in a vise or other suitable supporting-clamp. The pointed end of the centering-stem is now thrust into the bore 6 of the drill-stock in order to guide the die or active face of the sharpener into proper relation with the points or teeth of the drill. The points 12 of the die-face enter the spaces between the teeth 7 of the drill, and the sharpener is then struck with the proper number of blows until its die-face brings the teeth of the drill to the required sharpened condition, this operation being facilitated by the heated condition of the drill. The sharpener and the centering-stem may now be withdrawn, and, if necessary, the pointed end of the drill may be dressed by a file or other implement. The drill is now in a condition to be tempered in any of the usual ways, and this operation repoints the drill, so as to restore its working end to a condition practically as good as new.

Another important feature of our invention resides in the detachable connection of the centering-stem to the sharpener. Repeated use of the sharpener is liable to impair the efficiency of its die-surface, and by making the stem removable such die-surface may itself be easily redressed to bring it in a condition which will attain maximum efficiency in the operation of reforming the drill.

Changes in the form and proportions of parts may be made without departing from the spirit of the invention.

Having thus described the invention, what we claim is—

A rock-drill sharpener comprising an elongated stock provided at one end with an annular die-face, and with a central socket or bore opening through the said face, and a centering-stem fitted at one end in the socket or bore of the stock and held rigid therewith, said stem extending beyond the die-face, and being removable and replaceable, substantially as set forth.

In testimony that we claim the foregoing as our own we have hereto affixed our signatures in the presence of two witnesses.

RALPH M. CROCKETT.
HARVEY J. BUNDY.

Witnesses:
WILLIAM C. LAUDER,
WILLIAM GUTE.